Oct. 2, 1973 J. HERMES Re. 27,773
METHOD FOR THE CONTINUOUS TEXTURIZING OR VOLUMINIZING OF TEXTILE MATERIALS
Original Filed March 6, 1968
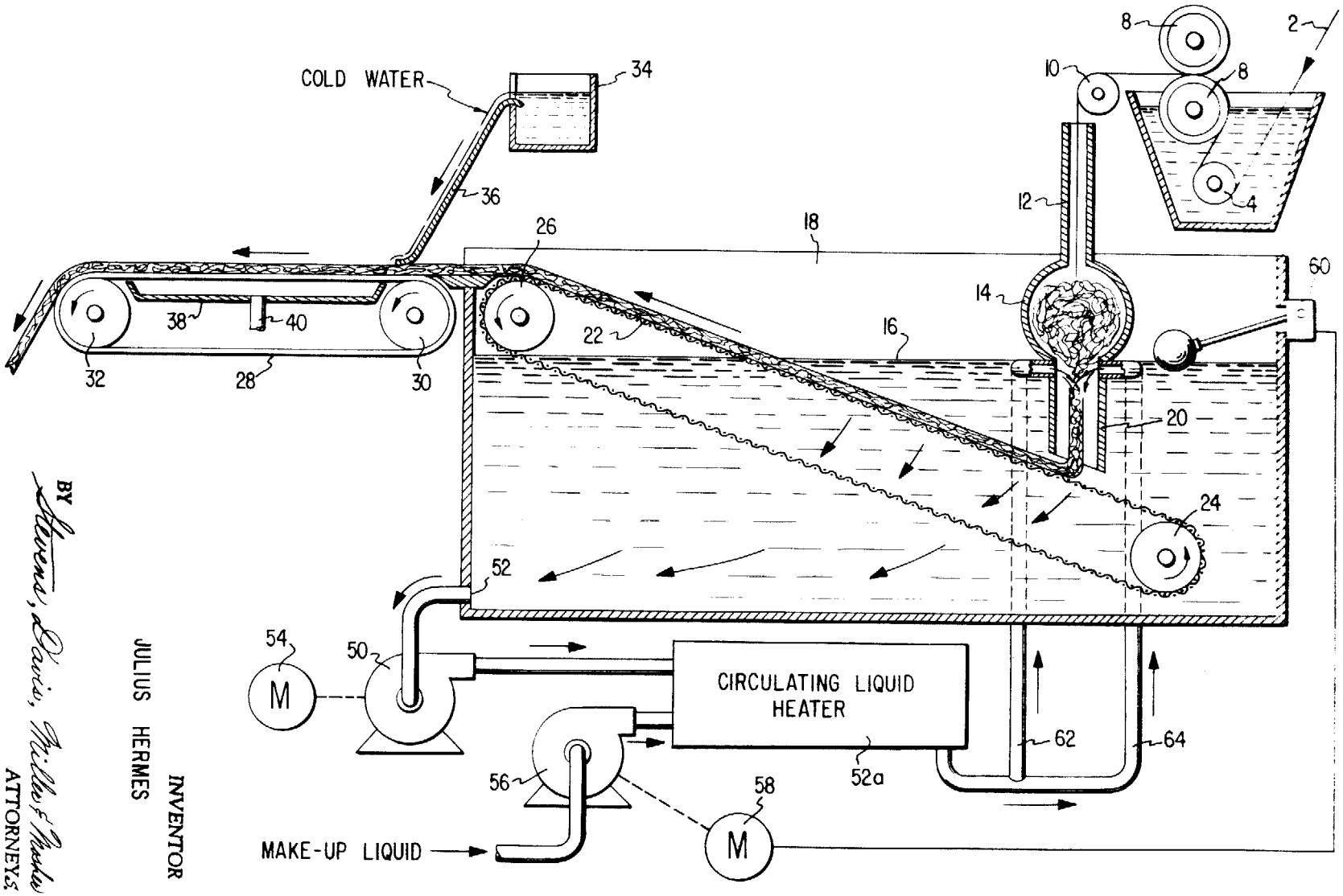
INVENTOR
JULIUS HERMES
BY Stevens, Davis, Miller & Mosher
ATTORNEYS United States Patent Office Re. 27,773
Reissued Oct. 2, 1973

27,773

METHOD FOR THE CONTINUOUS TEXTURIZING OR VOLUMINIZING OF TEXTILE MATERIALS

Julius Hermes, Martinsville, Va., assignor to Martin Processing Company, Incorporated, Martinsville, Va.

Original No. 3,518,734, dated July 7, 1970, Ser. No. 711,057, Mar. 6, 1968. Application for reissue Jan. 27, 1971, Ser. No. 110,347
Int. Cl. D02g *1/00*
U.S. Cl. 28—72.1 3 Claims

Matter enclosed in heavy brackets [ ] appears in the original patent but forms no part of this reissue specification; matter printed in italics indicates the additions made by reissue.

ABSTRACT OF THE DISCLOSURE

Textile materials are texturized, voluminized or bulked by contacting same with a relatively low boiling liquid, such as water or alcohol, and then with a hot relatively high boiling liquid. The resulting flashing of the relatively low boiling liquid into vapor separates, entangles, intermingles and intertwines the filaments of the textile material.

The present invention relates to the continuous texturizing or vulminizing of textile material which may be in the form of a multiple yarn, a woven material, a knitted material or indeed in any other desired form or shape, by a vary simple process readily capable of operation on a commercial scale. Both a novel method and a novel apparatus for carrying out the method are contemplated.

It is well known in the textile industry to create a textured or bulky yarn, and numerous methods for texturizing or bulking yarns have been described in patents and other technical literature. As is well known in the textile art, the reason for texturizing or bulking or crimping yarns or tows is to achieve a more pleasing textile fabric upon subsequent weaving, knitting, tufting, etc.

Generally speaking, in carrying out most of those prior art processes individual ends are processed. Those methods are expensive and time-consuming and the machinery for putting them into practice requires considerable floor space. Since in such processes the texture must be heat-set on each individual end of yarn, it can readily be seen that the practical difficulties involved in controlling the temperatures of multiple small heating units becomes considerable. If the heat-setting of these individual ends is uneven, this results in defects during subsequent processing (e.g., weaving, knitting, dying and finishing) such as may render the processing economically unfeasible.

In attempting to texturize and crimp multiple ends of yarn by the so-called stuffer-box technique, undesirable unevenness results due to unavoidable and uncontrollable friction in the stuffer-box.

The present invention is based upon a complete departure in concept from all previous attempts at producing the desired textile materials, and consequently it is free from the various difficulties and shortcomings of the prior art mentioned above.

Moreover, the process of this invention is relatively inexpensive and the apparatus required for carrying out the process is relatively simple as shown in the accompanying drawing that provides still better to illustrate the invention. Due to its simplicity, in fact there is no practical limit to the number of ends of yarn that can be rendered voluminous according to this invention in a simple, economical and effective manner.

According to the present invention, it has been discovered that an end of synthetic or other textile material, which may take the form of a continuous filament yarn or a spun yarn, tow or fabric (which may already be in the form of a woven, or a knitted or a tufted textile material) is contacted with a relatively low boiling liquid, which may be cold or at or near its boiling point, and the textile material thus wetted is then suddenly exposed to or brought into contact with a relatively high boiling liquid which is at a relatively elevated temperature.

The relatively low boiling liquid may for example be water or a relatively low boiling alcohol such as ethanol.

The relatively high boiling liquid is preferably one which has a normal boiling point far in excess of that of the relatively low boiling liquid, for example, polyhydric alcohols and ethers thereof such as ethylene glycol, propylene glycol, diethylene glycol, triethylene glycol, glycerin, etc. [It is also possible, although less desirable for many uses, to employ a relatively high boiling mineral oil such as highly refined mineral oil without additives having a boiling range such that it may be maintained at elevated temperatures of the order of 250°–450° F. without substantial decomposition and without substantial loss of volatile liquid.] However, [since it is generally less convenient to effect substantial or complete removal of the mineral oil from the treated textile material,] it will ordinarily be preferred [to avoid such high boiling liquids of mineral origin and rather] to employ a relatively high boiling water-soluble liquid such as the glycol and glycol ethers to which reference has already been made. It is also possible to employ a hot bath liquid such as a concentrated brine in conjunction with an alcohol as the cold relatively low boiling saturant for the textile material. Such a combination may be especially desirable for use with textile materials made of certain synthetics such a polypropylene.

As indicated above, upon contacting the wetted textile material with the hot liquid of relatively high boiling point, the sudden and instantaneous creation of superheated steam (in case water is the relatively low boiling liquid) due to the substantially instantaneous flashing of the water with the consequent creation of a violent turbulent effect upon the fibers comprising the textile material, causes the individual filaments thereof to fly about and apart and to become immediately entangled thus forming the most uneven configurations and disorientation of the thus-distorted filaments, with consequent maximum texturizing or bulking effect. While this bulking effect is going on, the hot liquid is at a sufficiently high temperature as to bring about heat-setting of these uneven configurations.

The texturized or bulked textile material thus obtained is withdrawn or removed from the high temperature bath liquid and then chilled by contact with cold water or other low boiling solvent or liquid to permanently set the uneven configurations while at the same time effecting substantially complete removal of the residual relatively high boiling liquid from the voluminized textile material with which it had been contacted.

Individual filaments of the textured textile material will show full loops, whorls, and complex entanglement with other filaments. Generally speaking, the texturing is more random and disordered than textile products made by other texturing methods such as edge crimping, stuffing box and gear crimping and false twisting.

The foregoing effects or operations upon the textile material are carried out while the textile material is in a relaxed or relatively untensioned condition.

The textile material thus treated may then be tensioned with substantial tensioning being employed so as to bring about apparent loss of the texturized appearance thereof and, while in that condition, subjected to further textile processing. Thereafter, in case of textile materials made of a yarn having a latent memory, the fabricated textile material upon being again subjected to wet or dry heat will then regain the textured or bulky appearance that was imparted to it intially by the process of this invention.

Experience with the process of the present invention has shown that the degree of texturizing can be altered at will in a very convenient fashion. For example, if the yarn or other textile material is introduced into the hot relatively high boiling liquid at a somewhat higher rate of speed then it is withdrawn therefrom (for example, 30% higher) the degree of texture increases proportionately. It has also been discovered that the degree of unevenness of configuration increases when the yarn or other textile material contains a higher percentage of water or other relatively low boiling liquid. This, of course, is due to the greater explosive force that is created upon contact with the wet yarn or other textile material with the hot relatively high boiling liquid.

It has also been discovered that a maximum degree of voluminosity or bulking is achieved by adding a highly foaming detergent to the water bath employed to wet the yarn or other textile material. The foam caused by the detergent upon contact with the hot relatively high boiling liquid, together with the steam and the resulting explosive turbulent effect induced thereby, brings about an even greater degree of entanglement and intertwining of the individual filaments of the textile material undergoing treatment.

As indicated above, it has been discovered that yarns and other textile material processed by the present invention have a latent memory. Consequently, the yarn or other textile material may be stretched subsequently to remove all or substantially all of the imparted configurations and transform the yarn again into what superficially appears to be its original form. A yarn or other textile material thus stretched is considerably easier to handle during subsequent processing such as weaving, knitting, tufting, etc.

After a fabric has been manufactured from these stretched texturized yarns, it may be exposed to either dry or wet heat resulting in the reappearance or recreation of the original configurations and thus producing a voluminous fabric. For example, it is possible to tuft a carpet with stretched yarn produced according to the present invention, using very fine needles during the tufting operation, and then upon steaming the resulting carpet shows a density heretofore impossible to attain.

In the case of spun yarn, it becomes possible by means of the present invention to bloom or bulk this yarn substantially instantaneously as compared with boiling such a yarn for a considerable time in an effort to achieve the same degree of voluminosity. For example, a spun polyester carpet yarn was received from the spinning mill at a diameter of 2.5 millimeters and, when processed in accordance with the present invention, that yarn had acquired a diameter of 4.5 millimeters.

The present invention is readily applicable to a wide variety of materials employed for textile purposes where a texturized or bulky appearance is desirable. For example, it may be applied to synthetic textile materials such as those made from polyesters, polyacrylics, polyamides (including nylon-66 and nylon-6 and nylon-11), polypropylene, etc., as well as to textile materials of natural origin such as wool and cotton.

It will of course be appreciated that the liquid having the relatively high boiling point referred to above must be compatible having regard to the particular textile material undergoing treatment, i.e., it must not have any detrimental effect thereon such as undue solubilizing, tackifying, embrittling or tenderizing, or undue chemical reaction with dyestuffs or other textile treating agent to which the textile material might have been subjected prior to the voluminizing procedure of the present invention.

Since the texturizing or bulking procedure in accordance with the present invention is substantially instantaneous, and depends solely upon the flashing or explosive action of the relatively low boiling liquid, the texturized material is then exposed for the purpose of heat-setting it, preferably while in contact with the same hot relatively high boiling liquid, for an additional short period of time which may be for two or more seconds.

When it is possible to make a rather wide selection of relatively high boiling liquids suitable for use as the hot contacting or bath liquid, it will frequenly be found that certain types of textile material will be more conveniently treated with certain types of liquids in preference to others. For example, in the case of acrylics diethyleneglycol is prefered for use as the relatively high boiling liquid. In the case of polyesters, not only diethylene glycol but also dipropylene glycol is very satisfactory. In the case of polyamides, it has been discovered that ethylene glycol is suitable. In the case of polypropylene, ethylene glycol can conveniently be employed. In the case of natural textile materials such as wool and cotton diethylene glycol is very satisfactory. In all cases, due regard must be given to the melting point or decomposition point of the textile material in question so as not to exceed the melting point or the decomposition point (as the case may be) in any stage of processing with hot relatively high boiling liquid.

Suitable apparatus in which the process of the present invention may conveniently be carried out is shown by way of illustration in the accompanying drawing in order still better to describe the invention.

Referring to the drawing, a textile material to be subjected to the texturizing or voluminizing process of the present invention is shown at 2. The textile material may be in the form of filaments or may be a yarn or a woven, knitted or tufted fabric.

The textile material passes over the roller 4 into a container for a relatively low boiling liquid such as water and then passes between a pair of pull rollers 8, which may be rubber-covered rollers. The textile material having passed through the water bath is passed between the pull rollers 8 at any convenient speed which may be as high as approximately 100 yards per minute or even higher. The textile material leaves the rollers 8 via roller 10 and then passes through a tube 12 through which the wetted textile material is introduced from the roller 10. This tube 12 has an enlarged portion 14 near its bottom end forming a texturizing "explosion" chamber 14 the bottom outlet of which is disposed at or substantially even with the upper surface 16 of liquid in a tank 18. This tank 18 contains a relatively high boiling liquid such as diethylene glycol. The textile material 2 wetted with water from the water bath passes into this explosion chamber at a speed greater than that at which it is withdrawn and therefore builds up in volume or mass in the explosion chamber 14. At the bottom outlet of the explosion chamber the wetted textile material contacts the upper level 16 of the relatively high boiling liquid in the tank 18 which is maintained at a suitably high constant temperature which may be, depending upon the nature of the textile material, as high as 425° F.

Immediately upon contacting the upper surface of the hot liquid the water-wetted yarn in effect bulks or texturizes with explosive force due to the formation of steam in situ and thus becomes texturized or bulked. The excess steam or vapor of the relatively low boiling liquid escapes or is vented from the upper end of tube 12. The resulting texturized textile material is then caused to descend downwardly through a lower extension of the tube 12 indicated by the reference numeral 20, being assisted in this by circulation of the hot relatively high boiling liquid as described hereinafter. Disposed below the bottom outlet of the extension 20 is a suitable conveyor belt 22 passing between rollers 24 and 26 upon which the freshly texturized textile material is deposited. The conveyor belt may for example be formed of stainless steel mesh or other material havinng no adverse effect upon the textile material undergoing processing.

The upper run of the conveyor belt 22 moves in a direction to the left, as shown in the figure, thus carrying with it through and out of tank of hot relatively high boiling liquid the textured or bulky textile material resting thereon.

The upper roller 26 over which passes the conveyor belt 22 is provided with vaccum suction means in a manner well known in the art whereby a substantial portion of the hot bath liquid adhering to the textile material is removed.

The textile material then passes to a second conveyor belt 28 mounted on rollers 30 and 32 on which it is further treated by subjecting it to cold water for purposes of permanently setting same. The cold water may be disposed in tank 34 and caused to overflow onto an inclined waterfall 36, and serves not only to permanently set the textile material but also to remove residual relatively high boiling liquid that was not already removed by passage over the vacuum suction roller 26. The conveyor belt 28 may also conveniently be made of stainless steel mesh whereupon the cold water from the waterfall 36 contacts the textile material and passes through the stainless steel mesh conveyor belt 28 and is removed via pan 38 and outlet 40. If desired, relatively high boiling liquid may be recovered if economically feasible, or if not desired the wash liquid may simply be run to the sewer.

It will be noted in connection with the vacuum suction roll 26 that the main portioin of the relatively high boiling liquid that is removed from the textile material at that point is preferably returned to the tank 18 for reuse and is therefore not wasted.

Referring now to the circulation of the hot relatively high boiling liquid in the tank 18, a pump 50 is provided which may be a centrifugal pump. An outlet 52 is provided near the lower left end of tank 18, as shown, and the hot bath liquid removed via that outlet is passed through circulation pump 50. The speed of the pump can be varied at will by means of the drive motor 54, depending upon the conditions desired by the operator. The effluent from the pump 50 is then passed into one or more heaters **52*a*** where the temperature of the circulating liquid is brought back up to the desired operating level.

If desired, make-up liquid may be injected into the system by means of a suitable injection pump 56 at a point just ahead of or at the heaters **52*a***.

The pump 56 may be driven by motor 58 which in turn is controlled by a conventional constant-level float device 60.

The liquid passing from the heater **52*a* is returned to the tank 18 in any suitable manner. Preferably it is reintroduced into the liquid in the tank 18 by passing it into the outlet extension 20 of the tube 12 at a point adjacent the outlet of the enlarged explosion chamber 14**.

By way of example, and as shown in the drawing, the flow of circulating liquid is split between lines 62 and 64 and the hot circulating liquid is returned at or very near the point where the newly-formed texturized textile material is removed from the explosion chamber 14 on its way to extension 20. In this way a ready supply of hot relatively high boiling liquid at the proper temperature is assured for contacting the newly texturized textile material and for assisting with the downflow thereof and moving the texturized textile material through and out of the extension 20 and on to the conveyor belt 22.

It will be noted that since the centrifugal pump 50 withdraws hot liquid from the tank 18 via outlet 52 the only inlet for liquid being via the split flow lines 62 and 64, there is automatically created within the tank 18 a flow pattern which assists in keeping the texturized textile material as it is removed via the conveyor belt 22 onto that belt due to the enforced circulation of the liquid in the tank.

If desired, baffles or other flow directing means (not shown) may be disposed in the tank 18 above and/or below the conveyor belt 22 including between the runs of the belt 22. These baffles may be desirable to prevent the formation of eddy currents in more remote portions of the tank 18 that otherwise might tend to disturb the even removal of the texturized material as it rests on the conveyor belt 22.

The centrifugal pump 50 can be adjusted to any speed desired to facilitate the passage of the texturized textile material descending through the tube extension 20. This speed control for the circulating hot liquid assures substantially zero tension on the texturized material descending in tube 20.

The speed of the conveyor belt 22 can be suitably adjusted (by conventional means not shown) to increase or decrease the exposure time in the hot relatively high boiling liquid, it being borne in mind however that a minimum time of about 2 seconds is desired for heat-setting purposes. After the texturized material produced in accordance with the present invention is removed from conveyor belt 28 it may if desired be washed again and dried on conventional equipment well known in the textile art.

The entire apparatus may conveniently be disposed with a hood or other well-ventilated enclosure in order to prevent inconvenience to workmen or others concerned with practicing the invention.

By way of further detail, when an end of polyester continuous filament yarn consisting of 32 individual filaments with a total denier of 150 was wetted in cold water of approximately room temperature and then suddenly exposed to dipropylene glycol at a temperature of 380° F. as and in the manner described above, an explosive vaporization of the water to superheated steam occurred causing the individual filaments of the yarn to fly about and become entangled and produce as a final product a high quality texturized yarn of increased volume. The temperature of the dipropylene glycol was sufficiently high to heat-set the uneven configurations of the filaments and the subsequent chilling step in cold water imparted the desired permanent set to the uneven configuration.

A similar treatment of polypropylene yarn, but at a lower temperature due to the lower melting point of the polypropylene, gave similar results. The polyproylene yarn was a carpet yarn having a total of 4,000 denier and consisted of approximately 267 filaments. The initial treatment with the relatively low boiling liquid was with cold water at substantially room temperature and the treatment with the relatively high boiling liquid was carried out with ethylene glycol at a temperature of about 280° F. A well-texturized polypropylene yarn of high quality was obtained.

An otherwise similar treatment of an otherwise similar polypropylene yarn was carried out with ethanol at room temperature as the first treating liquid and with ethylene glycol at 280° F. as the second treating liquid. This also resulted in the production of a high-quality texturized polypropylene yarn.

It is also possible to texturize a polypropylene yarn in an otherwise similar fashion, but with the substitution of a concentrated brine at a temperature of 280° F. as the relatively high boiling liquid, and with similar results.

Using a combination of water at room temperature as the first liquid and ethylene glycol at 340° F. as the second or bath liquid, a nylon-66 yarn may be readily texturized in accordance with the present invention. The nylon yarn consisted of approximately 70 filaments having a total denier of 1040.

What is claimed is:

[1. A method for texturizing a textile material comprising wetting said textile material with a relatively low boiling liquid, passing the wetted textile material into contact with a relatively high boiling liquid maintained at a temperature substantially higher than that of the wetted contact material but not sufficiently high as to have any substantial adverse effect upon the textile material undergoing treatment, said contact taking place while the wetted textile material is substantially free of tensile stress, and thereby causing the relatively low boiling liquid to evaporate explosively in situ and cause separation, entangling, intertwining and interlocking of the individual filaments of which the textile material is composed, removing the thus-treated textile material from the heated relatively high boiling liquid, and substantially completely separating the relatively high boiling liquid from the thus-texturized textile material.]

[2. A method as defined in claim 1, wherein the relatively low boiling liquid with which the textile material is initially contacted is water.]

[3. A method as defined in claim 1, wherein the relatively high boiling liquid with which the wetted textile material is contacted is a glycol.]

[4. A method as defined in claim 1, wherein the textile material undergoing treatment, after being wetted with the relatively low boiling liquid, is introduced to the point of contact with the heated relatively high boiling liquid under conditions of free fall and therefore substantially free of any tensile stresses.]

[5. A method as defined in claim 4, wherein the wetted textile material is introduced to the point of contact with the heated relatively high boiling liquid by overfeeding and thereby is substantially free from tensile stresses during the explosive evaporation of the relatively low boiling liquid from the textile material.]

[6. A method as defined in claim 1, wherein the wetted textile material is introduced to the point of contact with the heated relatively high boiling liquid in a region of relatively increased cross-section as compared to the cross-section of the immediately preceding region, thereby enabling a buildup in mass of the initially texturized material resulting from the explosive evaporation of the relatively low boiling liquid in situ.]

[7. A method as defined in claim 1, wherein the textile material undergoing treatment is in the form of a bundle of yarn.]

[8. A method as defined in claim 7, wherein the textile material undergoing treatment is a yarn composed of synthetic thermoplastic material.]

[9. A method as defined in claim 7, wherein the textile material undergoing treatment is a yarn composed of fibers of natural origin.]

10. A method of producing a texturized textile material comprising passing the textile material to be texturized through a water bath and then between a pair of variable speed feed rollers by means of which the wetted textile material is overfed into a partially enclosed region which enlarges into an explosion zone of relatively larger volume which is disposed adjacent a bath of a liquid *selected from the class consisting of glycols and glycol ethers* which is maintained at a temperature below that having any appreciable deleterious effect upon the textile material but substantially above the boiling point of water so that upon contact of the overfed wetted textile material with the heated liquid the water is explosively evaporated from the textile material with the substantially instantaneous conversion of the textile material into a relatively large mass of fibers disarranged and entangled and intertwined and interlocked with each other in said enlarged explosion zone, passing the thus-texturized textile material downwardly with the aid of downwardly flowing heated liquid to and through an extension of the explosion zone and onto a traveling perforated conveyor belt which removes the texturized textile material from the bath of heated liquid, at least partially removing liquid from the texturized material by means of vacuum-suction, passing the thus-treated material to a separate traveling conveyor belt where it is contacted with cold water for removing residual liquid from the texturized material and *simultaneously* permanently setting same, and recovering the thus permanently set texturized textile material.

11. A method is defined in claim 10, wherein the bath of heated liquid is maintained at a predetermined level and circulation of said heated liquid is effected by continuously withdrawing a portion of said heated liquid at a point of the bath remote from the explosion zone, adding makeup liquid as required, heating said withdrawn portion of liquid, and reintroducing the circulating stream of heated liquid to the bath at a point adjacent the point of withdrawal of the freshly texturized material from the explosion zone on its way to the traveling perforated belt.

[12. A method as defined in claim 1, wherein the relatively low boiling liquid with which the textile material is initially contacted is alcohol.]

[13. A method as defined in claim 1, wherein the relatively high boiling liquid with which the wetted textile material is contacted is a glycol ether.]

[14. A method as defined in claim 1, wherein the textile material undergoing treatment is in the form of a bundle of tow.]

*15. A method of producing a texturized textile material comprising passing the textile material to be texturized through a water bath and then between a pair of variable speed feed rollers by means of which the wetted textile material is overfed into a partially enclosed region which enlarges into an explosion zone of relatively larger volume which is disposed adjacent a bath of a liquid selected from the class consisting of glycols and glycol ethers which is maintained at a temperature below that having any appreciable deleterious effect upon the textile material but substantially above the boiling point of water so that upon contact of the overfed wetted textile material with the heated liquid the water is explosively evaporated from the textile material with the substantially instantaneous conversion of the textile material into a relatively large mass of fibers disarranged and entangled and intertwined and interlocked with each other in said enlarged explosion zone, passing the thus-texturized textile material downwardly with the aid of downwardly flowing heated liquid to and through an extension of the explosion zone and onto a traveling perforated conveyor belt which removes the texturized textile material from the bath of heated liquid, at least partially removing liquid from the texturized material by means of vacuum-suction, passing the thus-treated material to a separate traveling conveyor belt where, while continuing to maintain the thus-treated material substantially free of tensile stress, it is contacted with cold water for removing residual liquid from the texturized material and by chilling simultaneously permanently setting same, and recovering the thus permanently set texturized textile material.*

References Cited

The following references, cited by the Examiner, are of record in the patented file of this patent or the original patent.

UNITED STATES PATENTS

| | | | |
|---|---|---|---|
| 2,249,756 | 7/1941 | Finzel | 8—130.1 |
| 2,282,568 | 5/1942 | Finzel | 8—130.1 X |
| 2,375,864 | 5/1945 | Morgan | 8—130.1 X |
| 2,878,547 | 3/1959 | McMaster et al. | 28—1.2 |
| 2,938,811 | 5/1960 | Hermes | 8—130.1 |
| 3,190,718 | 6/1965 | Schoeneberg et al. | 8—130.1 |
| 2,948,927 | 8/1960 | Rasmussen. | |
| 2,954,587 | 10/1960 | Rasmussen. | |
| 3,096,563 | 7/1963 | Messinger. | |
| 3,165,826 | 1/1965 | Bywtov | 264—84 X |

ROBERT R. MACKEY, Primary Examiner

U.S. Cl. X.R.

8—130.1